DIGITAL DATA TRANSMISSION SYSTEM

Filed Oct. 6, 1967

INVENTOR.
GARY C. BABCOCK
BY
ROY MILLER
ATTORNEY.

United States Patent Office 3,497,619
Patented Feb. 24, 1970

3,497,619
DIGITAL DATA TRANSMISSION SYSTEM

Gary C. Babcock, China Lake, Calif., assignor to the United States of America as represented by the Secretary of the Navy Filed Oct. 6, 1967, Ser. No. 674,062
Int. Cl. H04l 15/00, 25/02
U.S. Cl. 178—68 7 Claims

ABSTRACT OF THE DISCLOSURE

An apparatus for use in a digital computer system which comprises a means for transmitting pulses in opposite directions in a transmission line so that the pulses are not reflected from either end of the line, which pulses can be received at any point along the transmission line. Both sides of the transmission line have equal impedance to ground, regardless of whether the line is pulsed or not, so that each of the individual lines of the transmission line will contain equal amounts of noise which is capable of being removed by a differential amplifier.

GOVERNMENT INTEREST

The invention described herein may be manufactured and used by or for the Government of the United States of America for governmental purposes without the payment of any royalties thereon or therefor.

BACKGROUND OF THE INVENTION

The present invention relates to improvements in sending digital information via a transmission line, and more particularly pertains to a new and improved system for sending such digital information wherein noise can be rejected by a line receiver.

In the computer field it has been the general practice to employ coaxial cable for use in transmitting digital data. Since it is sometimes desirable to pulse or drive the line at more than one point, use of coaxial cable is disadvantageous because of the expense involved in making connections, and the bulk of the line itself. Present twisted pair transmission line circuits, which are less expensive and more compact than those using coaxial cable, require that one side of the transmission line be grounded. This is undesirable because noise can be picked up more easily by the ungrounded wire than by the grounded wire, giving rise to noise that is not common mode. Common mode noise can be rejected by a line receiver that has a differential aspect, so it is advantageous for any noise picked up on the transmission line to be common mode noise.

SUMMARY

The general purpose of this invention is to provide a digital data transmission system that has all the advantages of the above described prior art and has none of the disadvantages. To attain this, the present invention provides a unique arrangement whereby neither conductor of the transmission line is grounded, and each conductor "sees" the same impedance to ground, so that all noise is common mode.

DESCRIPTION OF THE INVENTION

Figure 1A:
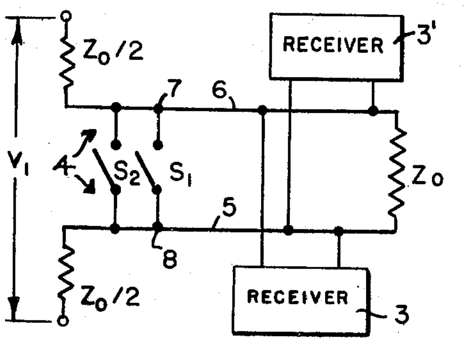
FIGS. 1A, 1B, 1C and 1D are block and line diagrams which depict various embodiments of the present invention.

Referring to FIG. 1A, a transmission line 4 consisting of lines 5 and 6 is terminated with impedance $Z_0$. The value of impedance $Z_0$ is chosen so that when the line is pulsed by switch $S_1$ or $S_2$ connected across lines 5 and 6 there will be no reflection from the terminating end of the line.

A voltage $V_1$ is applied across the other end of line 4 through two matched impedances, each having a value equal to one half that of $Z_0$, the characteristic impedance of the line. When either switch $S_1$ or $S_2$ is operated, a pulse is transmitted down the line to receivers 3 and 3'.

Figure 1B:
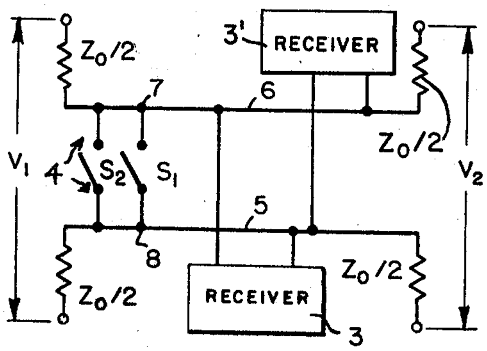

FIG. 1B describes a second embodiment of the invention wherein two voltage sources of different values are placed at either end of the transmission line.

Figure 1C:
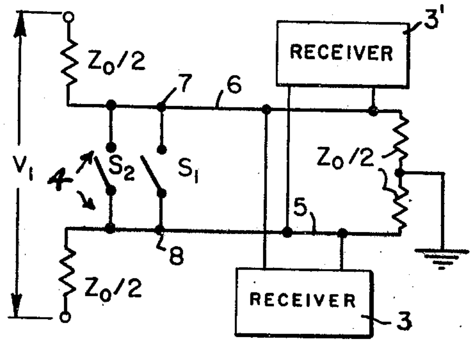

FIG. 1C show a third embodiment wherein the terminating impedance $Z_0$ is center-tapped and grounded.

Figure 1D:
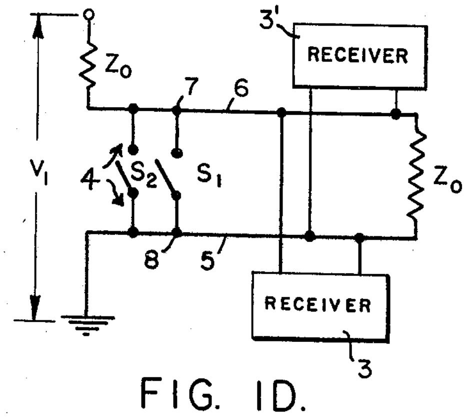

FIG. 1D shows a fourth embodiment wherein the voltage $V_1$ is applied across an impedance equal to the characteristic impedance of the line $Z_0$ and ground.

In the preferred embodiment, receivers 3 and 3' are of the differential type which have the capacity to filter out common mode noise. However, it is within the scope of the invention to use any piece of digital equipment as a receiver. Such equipment may be a digital computer, tape deck, digital to analog converter, printed, digital display transformer coupled receiver, or the like.

Additional drivers or receivers can be added anywhere along the transmission line as long as no more than one driver is "on" at any one time.

Figure 2:
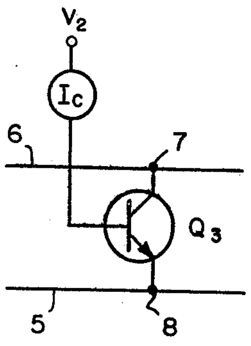
FIG. 2 is a block diagram of a transistorized switching circuit which is used in combination with the structure illustrated in FIGS. 1A, 1B, 1C and 1D.

FIG. 2 illustrates the use of a transistorized switching circuit $Q_3$ in the system in place of either $S_1$ or $S_2$; $I_C$ is a gated constant current source. When this switching circuit is used in combination with the system, both wires of the transmission line can change in potential with respect to $V_1$ and $V_2$ without turning the transistor off.

Figure 3:
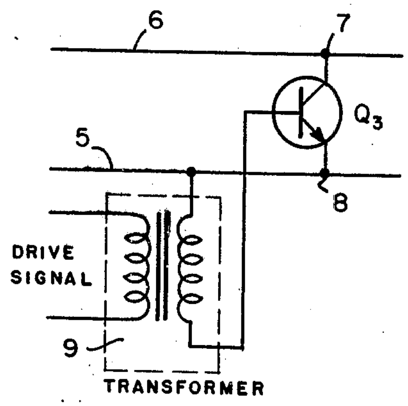
FIG. 3 is a block diagram of a transformer coupled driving circuit which is used in combination with the structure illustrated in FIGS. 1A, 1B, 1C, and 1D.

FIG. 3 demonstrates the use of a transformer 9 coupled driver in the system in place of either $S_1$ or $S_2$. Whenever transformer 9 is pulsed by a driving signal, transistor $Q_3$ closes, and remains closed until the current built up in the transformer 9 by the driving signal decreases to a level such that transistor $Q_3$ opens. The duration of closure of transistor $Q_3$ is a function of the inductance of the transformer 9 and the strength of the driving signal.

The transmission line 4 may be twisted wire, coaxial, stripline, flat conductor or the like.

What is claimed is:

1. A digital data transmission system adapted for computer use comprising:
   - a transmission line having terminals at either end;
   - termination means at each end of said line to prevent reflections on said line;
   - a source of electromotive force across said line;
   - a plurality of isolated switch means for pulsing the line placed at various intervals in time and space along the line; and
   - a plurality of differential type receivers placed at various intervals in time and space along the line to detect the pulses produced by the isolated switch means;

so that said transmission line operates in the absence of a ground, and each line contains an equal amount of noise which is removed by the differential receiver.

2. The system of claim 1 wherein at least one of said terminating means comprises an impedance.

3. The system of claim 2 wherein said impedance is center-tapped and grounded.

4. The system of claim 3 wherein the source of electromotive force comprises two impedances operatively connected to the terminals at one end of said line with a potential placed across said impedances.

5. The system of claim 3 wherein the source of electromotive force comprises an impedance equal to the characteristic impedance of the line operatively connected to one terminal at one end of said line, the other terminal at the same end grounded with a potential placed across the impedance to ground.

6. The system of claim 1 wherein the isolated switch means comprises a gated constant current source.

7. The system of claim 1 wherein the isolated switch means comprises a transformer coupled driver.

References Cited

UNITED STATES PATENTS

| | | | |
|---|---|---|---|
| 1,679,326 | 7/1928 | Drake | 178—69 |
| 1,808,220 | 6/1931 | Hansell | 178—66 |
| 2,734,944 | 2/1956 | Green et al. | 178—63 |

THOMAS A. ROBINSON, Primary Examiner

U.S. Cl. X.R.

178—69; 307—4; 325—161; 333—32